US012300423B2

(12) United States Patent
Oide et al.

(10) Patent No.: US 12,300,423 B2
(45) Date of Patent: May 13, 2025

(54) MULTI-LAYER COIL COMPONENT

(71) Applicant: TDK CORPORATION, Tokyo (JP)

(72) Inventors: Akihiko Oide, Tokyo (JP); Makoto Yoshino, Tokyo (JP); Tomoki Okada, Yurihonjo (JP); Hideki Saitou, Yurihonjo (JP); Seiji Osada, Yurihonjo (JP); Kazuhiro Ebina, Tokyo (JP); Kunio Oda, Tokyo (JP); Takashi Abe, Yurihonjo (JP); Akio Shibata, Tokyo (JP); Kazuo Iwai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 585 days.

(21) Appl. No.: 17/701,448

(22) Filed: Mar. 22, 2022

(65) Prior Publication Data

US 2022/0319766 A1 Oct. 6, 2022

(30) Foreign Application Priority Data

Mar. 30, 2021 (JP) ................................ 2021-057711

(51) Int. Cl.
*H01F 27/29* (2006.01)
*H01F 17/00* (2006.01)

(52) U.S. Cl.
CPC ....... *H01F 27/292* (2013.01); *H01F 17/0013* (2013.01); *H01F 2017/002* (2013.01)

(58) Field of Classification Search
CPC ............... H01F 27/292; H01F 17/0013; H01F 2017/002
See application file for complete search history.

(56) References Cited

U.S. PATENT DOCUMENTS

| | | | | |
|---|---|---|---|---|
| 6,154,114 | A | 11/2000 | Takahashi | |
| 6,544,365 | B2 * | 4/2003 | Tokuda | H01G 4/30 264/618 |
| 2008/0297299 | A1 * | 12/2008 | Yun | H01F 17/0013 336/200 |
| 2013/0147593 | A1 * | 6/2013 | Tachibana | H01F 17/0013 336/200 |
| 2014/0232504 | A1 * | 8/2014 | Tachibana | H01F 27/292 336/200 |
| 2015/0014042 | A1 * | 1/2015 | Noguchi | H05K 1/165 174/262 |
| 2018/0137964 | A1 * | 5/2018 | Tozawa | H01F 17/0013 |
| 2018/0158775 | A1 * | 6/2018 | Leipold | H10D 1/20 |

(Continued)

FOREIGN PATENT DOCUMENTS

| | | |
|---|---|---|
| JP | H08-055726 A | 2/1996 |
| JP | H11-317308 A | 11/1999 |

(Continued)

*Primary Examiner* — Malcolm Barnes
(74) *Attorney, Agent, or Firm* — Oliff PLC

(57) ABSTRACT

In the multi-layer coil component, the via conductor electrically connecting the coil layers adjacent to each other in the stacking direction of the element body protrudes from the coil region toward the side surface of the element body when viewed from the stacking direction of the element body. Therefore, the coil has a concave-convex portion. When a force is applied to the multi-layer coil component from the outside, the force is dispersed in the concave-convex portion of the coil, and thus defects are less likely to occur in the coil than in a coil in which the side of the side surfaces is flat.

6 Claims, 14 Drawing Sheets

(56) References Cited

U.S. PATENT DOCUMENTS

| | | | | |
|---|---|---|---|---|
| 2019/0122931 A1* | 4/2019 | Huang | ..................... | H10D 1/20 |
| 2020/0111603 A1* | 4/2020 | Sato | ....................... | H01F 27/292 |
| 2021/0202163 A1* | 7/2021 | Takai | ..................... | H01F 27/292 |
| 2024/0296987 A1* | 9/2024 | Ito | ........................ | H01F 27/2828 |

FOREIGN PATENT DOCUMENTS

| | | | |
|---|---|---|---|
| JP | 2002-270429 | A | 9/2002 |
| JP | 2005-167098 | A | 6/2005 |
| JP | 2018-170495 | A | 11/2018 |
| JP | 2019-004082 | A | 1/2019 |

* cited by examiner 26
24b
24a
24

23
23b
23a
26

22
22a
22b
26

26
21b
21a
21

MULTI-LAYER COIL COMPONENT

CROSS-REFERENCE TO RELATED APPLICATIONS

This application is based upon and claims the benefit of priority from Japanese Patent Application No. 2021-57711, filed on 30 Mar. 2021, the entire contents of which are incorporated herein by reference.

TECHNICAL FIELD

The present disclosure relates to a multi-layer coil component.

BACKGROUND

Conventionally, known in the art is a multi-layer coil component in which a coil having a coil axis parallel to a stacking direction is provided in an element body having a stacking structure. Japanese Patent Laid-Open No. 1995-317308 (Patent Document 1) discloses a technique of forming a coil layer and a via conductor constituting a coil by using a printing method.

SUMMARY

In the above-described multi-layer coil component according to the conventional art, when a force is applied from the outside, the force may reach the coil to cause a defect in the coil.

As a result of intensive studies, the inventors have newly found a technique in which a defect is less likely to occur in the coil by increasing mechanical strength even when a force is applied to a multi-layer coil component from the outside.

According to various aspects of the present disclosure, there is provided a multi-layer coil component in which mechanical strength of a coil is improved.

A multi-layer coil component according to one aspect of the present disclosure including an element body including a plurality of layers stacked and having a pair of end surfaces facing each other in a first direction parallel to a stacking direction of the plurality of layers and a side surface connecting the pair of end surfaces, a coil provided in the element body and having a coil axis parallel to the first direction; and, a pair of external electrodes respectively provided on the end surfaces of the element body, wherein the coil having a plurality of coil layers provided between the plurality of layers constituting the element body and arranged along the first direction; and, a plurality of via conductors provided between the coil layers adjacent to each other in the first direction and electrically connecting the adjacent coil layers to each other, wherein, when viewed from the first direction, the via conductor protrudes from a coil region where the coil layer is formed toward the side surface of the element body.

In the multi-layer coil component, since the via conductor protrudes from the coil region toward the side surface of the element body, the concave-convex portion is formed at the location of the via conductor. When a force is applied to the multi-layer coil component from the outside, the force is dispersed in the concave-convex portion, hence, defects are less likely to occur in the coil.

In the multi-layer coil component according to another aspect, the via conductor is formed of a plurality of conductor layers, and has a concave-convex portion that is concave-convex in a direction orthogonal to the first direction.

In the multi-layer coil component according to another aspect, the conductor layer has a cross-sectional shape in a cross section parallel to the first direction, in which two corners on one end surface side of the rectangular element body extending in a direction orthogonal to the first direction are rounded.

In the multi-layer coil component according to another aspect, in a cross section parallel to the first direction, the plurality of via conductors alternately protrudes from the coil region toward the side surface of the element body along the first direction on one side and the other side in a direction orthogonal to the first direction.

In the multi-layer coil component according to another aspect, in a plurality of cross sections parallel to the first direction, the plurality of via conductors protrudes from the coil region toward the side surface of the element body.

In the multi-layer coil component according to another aspect, the element body is a sintered element body.

DETAILED DESCRIPTION

Figure 1:
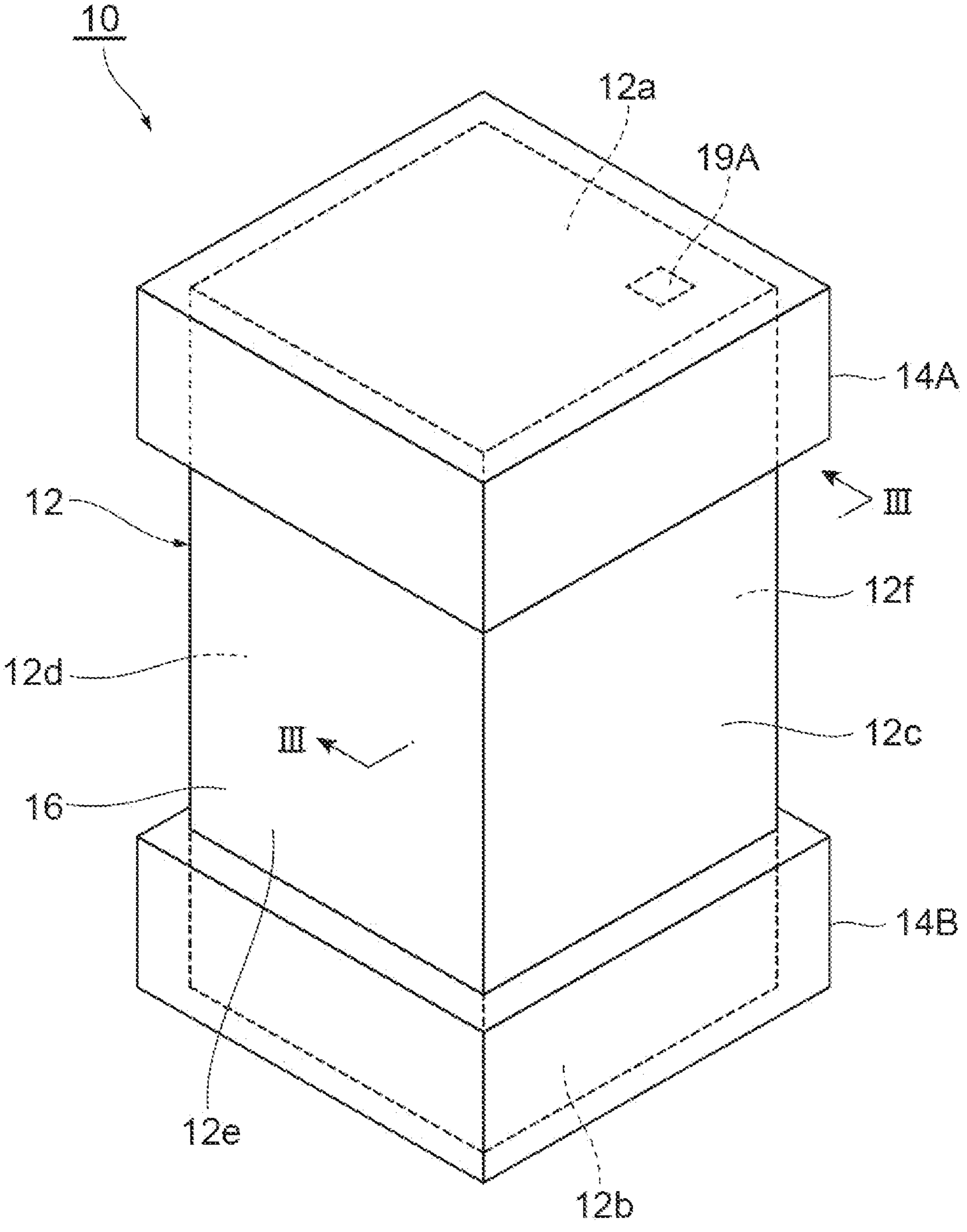
FIG. 1 is a perspective view showing the multi-layer coil component according to an embodiment.

Hereinafter, embodiments of the present disclosure will be described with reference to the accompanying drawings. In the description of the drawings, the same or equivalent element is denoted by the same reference numeral, and redundant description is omitted.

Figure 2:
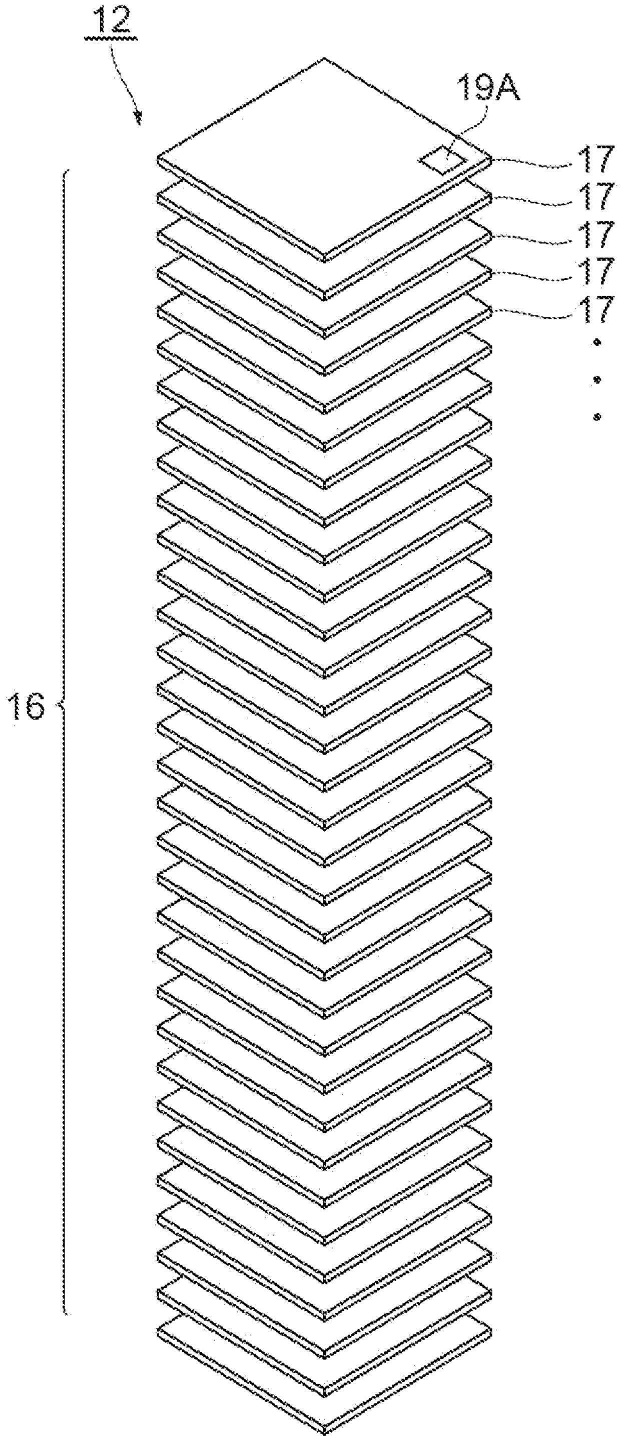
FIG. 2 is an exploded perspective view showing a stacked state of the element body shown in FIG. 1.

A structure of a multi-layer coil component according to an embodiment will be described with reference to FIGS. 1 to 3. As shown in FIG. 1, the multi-layer coil component 10 according to the embodiment includes an element body 12 and a pair of external electrodes 14A and 14B.

The element body 12 has a substantially rectangular parallelepiped outer shape and includes a pair of end surfaces 12*a* and 12*b* facing each other in the extending direction of the element body 12. The element body 12 further includes four side surfaces 12*c* to 12*f* extending in the direction in which the end surfaces 12*a* and 12*b* face each other and connecting the end surfaces 12*a* and 12*b* to each other. In the present embodiment, the side surface 12*d* is a mounting surface facing the mounting base when the multi-layer coil component 10 is mounted, and the side surface 12*c* facing the side surface 12*d* is a top surface when the multi-layer coil component 10 is mounted. When the dimension of the element body 12 in the facing direction of the end surfaces 12*a* and 12*b* is a length, the dimension in the facing direction of the side surfaces 12*e* and 12*f* is a width, and the dimension in the facing direction of the side surfaces 12*c* and 12*d* is a thickness, the dimension of the element body 12 is, for example, 1.6 mm length×08 mm width×0.8 mm thickness.

The pair of external electrodes 14A and 14B are provided on the end surfaces 12*a* and 12*b* of the element body 12, respectively. In the present embodiment, the external electrode 14A integrally covers the entire region of the end surface 12*a* and the side surfaces 12*c* to 12*f* of the region adjacent to the end surface 12*a*. Similarly, the external electrode 14B integrally covers the entire region of the end surface 12*b* and the side surfaces 12*c* to 12*f* of the region adjacent to the end surface 12*b*. Each of the external electrodes 14A and 14B includes one or more electrode layers. For example, a metallic material such as Ag may be used as an electrode material constituting each of the external electrodes 14A and 14B.

The element body 12 has a structure in which an internal conductor 18 is provided inside a magnetic body 16. The element body 12 has a stacking structure. The magnetic body 16 has a stacking structure in which a plurality of magnetic layers 17 are stacked in a direction in which the end surfaces 12*a* and 12*b* face each other. In the following description, the facing direction of the end surfaces 12*a* and 12*b* is also referred to as a stacking direction or a first direction of the element body 12.

The magnetic body 16 is made of a magnetic material such as ferrite. The magnetic body 16 is obtained by stacking and sintering a plurality of magnetic pastes (for example, ferrite pastes) to be the magnetic body layer 17. That is, the element body 12 has a print stacking structure and is a sintered element body, in which the magnetic layers 17 on which the magnetic paste is printed are stacked and sintered. The number of magnetic layers 17 constituting the element body 12 is, for example, 120 layers. The thickness of each magnetic layer 17 is, for example, 15 μm. In the actual element body 12, the plurality of magnetic layers 17 are integrated such that boundaries between the layers are not visible.

The inner conductor 18 includes one coil 20 and a pair of lead conductors 19A and 19B. Each of the coil 20 and the lead conductors 19A and 19B of the inner conductor 18 has a stacking structure in the stacking direction of the element body 12.

Figure 3:
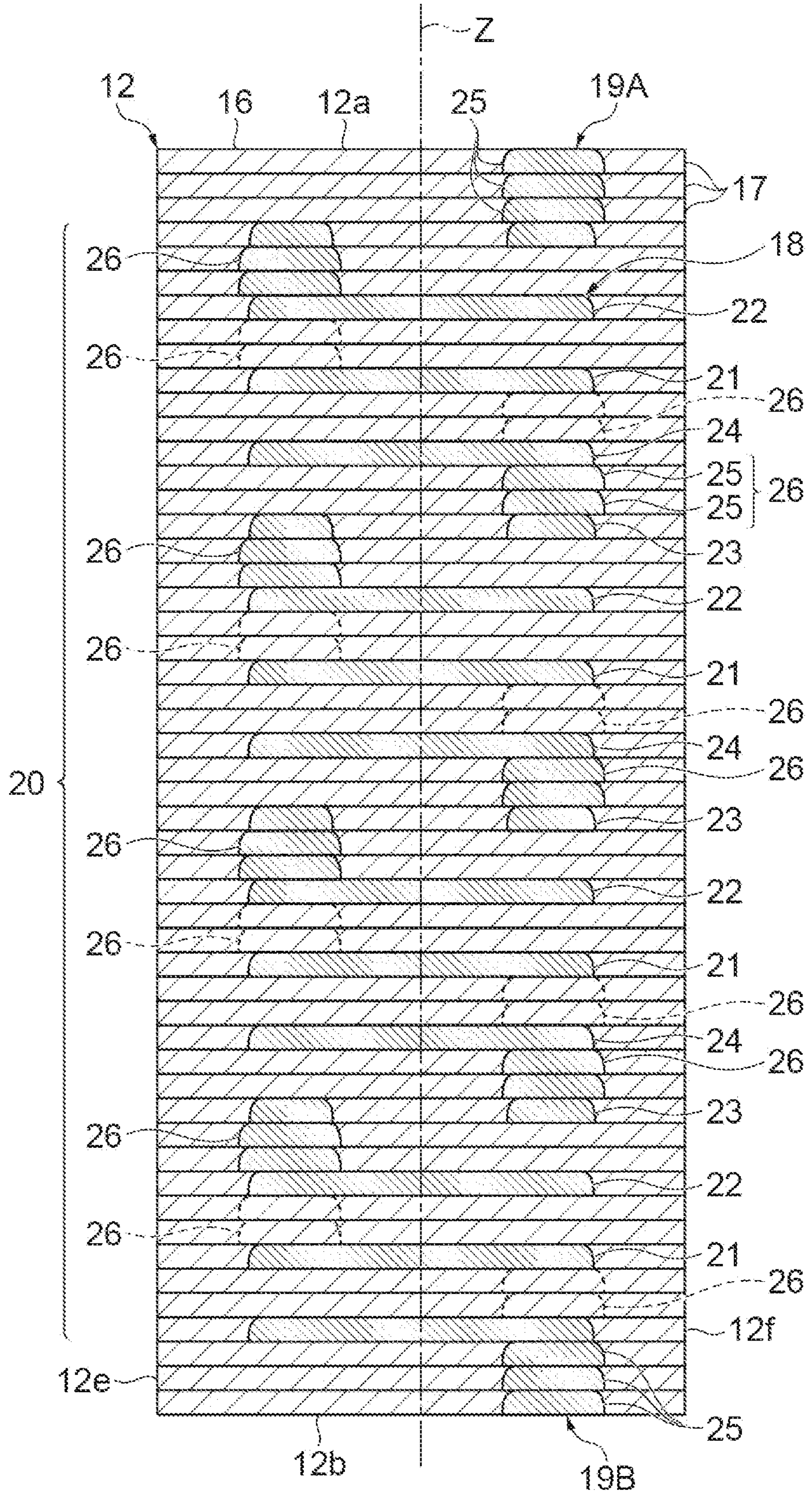
FIG. 3 is a cross-sectional view taken along line III-III of the element body shown in FIG. 2.
Figures 4A, 4B, 4C, 4D:
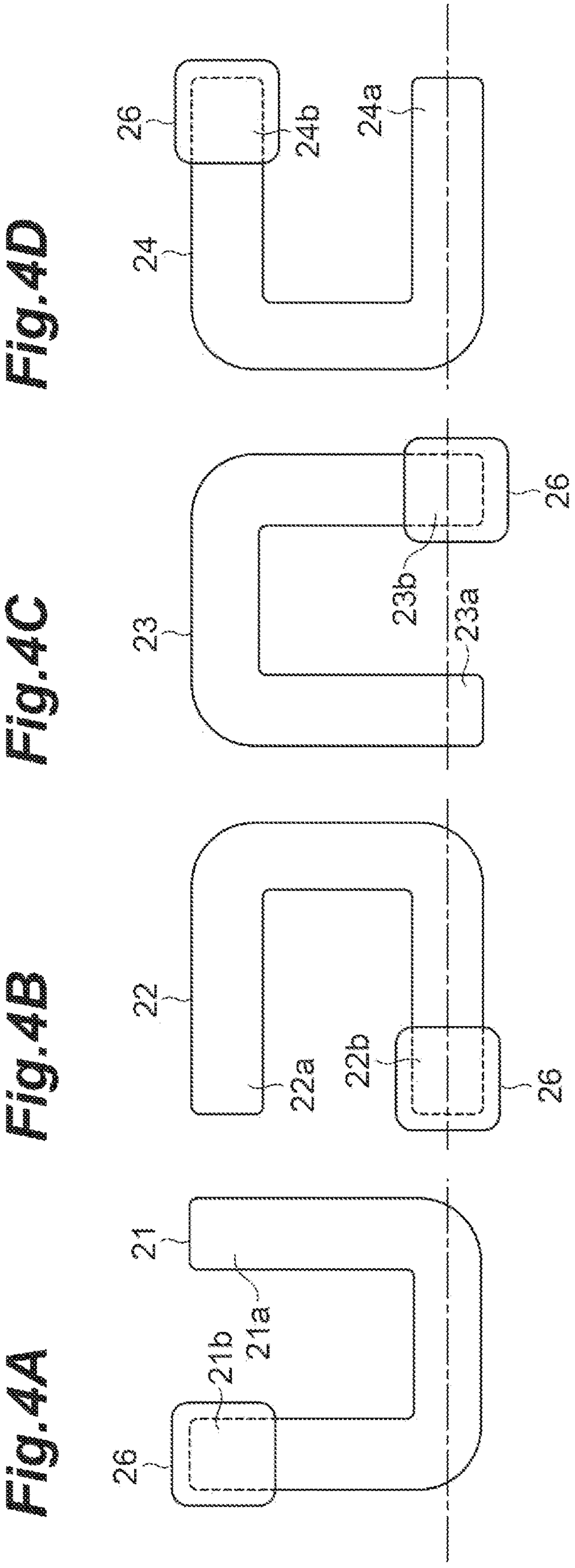
FIGS. 4A to 4D are plan views showing the coil layer constituting the coil shown in FIG. 3.

As shown in FIG. 3, the coil 20 has a coil axis Z parallel to the stacking direction of the element body 12 and is wound around the coil axis Z. In the present embodiment, the length of the coil 20 in the stacking direction of the element body 12 is 1.3 mm. In the stacking direction of the element body 12, the length of the coil 20 can be designed to be in a range of 50 to 80% of the length of the element body 12. In the present embodiment, the inner diameter of the coil 20 is 0.25 to 0.45 mm, for example, 0.3 mm.

In the present embodiment, the coil 20 includes four types of coil layers 21 to 24 as shown in FIGS. 4A to 4D. The coil layers 21 to 24 constituting the coil 20 are made of a conductive material containing a metal such as Ag. The coil 20 is formed by a printing method. Specifically, the coil 20 is obtained by applying a conductive paste (for example, Ag paste) to be the coil layers 21 to 24 on a magnetic paste to be the magnetic layer 17 and sintering the conductive paste. The thickness of each of the coil layers 21 to 24 is, for example, 30 μm.

Each of the coil layers 21 to 24 has a U-shape when viewed from the stacking direction of the element body 12, and constitutes ¾ turns of the coil 20. When viewed from the stacking direction of the element body 12, the coil layer 21 has a rotationally symmetric relationship with the coil layer 22 with respect to the coil axis Z, and when the coil layer 22 is rotated 90 degrees clockwise about the coil axis Z, the coil layer 22 completely overlaps the coil layer 21. The coil layer 22 is located on the upper side of the coil layer 21, and is electrically connected to an end portion 21*b* of the coil layer 21 at one end portion 22*a* via a via conductor 26 described later.

The coil layer 22 has a rotationally symmetric relationship with the coil layer 23 with respect to the coil axis Z, and when the coil layer 23 is rotated 90 degrees clockwise about the coil axis Z, they are substantially aligned. The coil layer 23 is located on the upper side of the coil layer 22, and is electrically connected to an end portion 22*b* of the coil layer 22 at one end portion 23*a* via the via conductor 26 described later.

The coil layer 23 has a rotationally symmetric relationship with the coil layer 24 with respect to the coil axis Z, and when the coil layer 24 is rotated 90 degrees clockwise about the coil axis Z, the coil layer 24 completely overlaps the coil layer 23. The coil layer 24 is located on the upper side of the coil layer 23, and is electrically connected to an end portion 23*b* of the coil layer 23 at one end portion 24*a* via the via conductor 26 described later.

The coil layer 24 has a rotationally symmetric relationship with the coil layer 21 with respect to the coil axis Z, and when the coil layer 21 is rotated 90 degrees clockwise about the coil axis Z, the coil layer 21 completely overlaps the coil layer 24. The coil layer 21 is located on the upper side of the coil layer 24, and is electrically connected to an end portion 24*b* of the coil layer 24 at one end portion 21*a* via the via conductor 26 described later.

One set of the coil layers 21 to 24 arranged in order in the stacking direction of the element body 12 are jointed with end portions thereof overlapping each other, and constitute three turns of the coil 20 surrounding the coil axis Z. In the present embodiment, the coil 20 includes a plurality of sets of coil layers 21 to 24.

The coil 20 further includes a plurality of via conductors 26. The plurality of the via conductors 26 connects the coil layers 21 to 24 adjacent to each other in the stacking direction. Each of the via conductors 26 includes a plurality of stacked conductor layers 25. In the present embodiment, the via conductors 26 includes two conductor layers 25. Similarly to the coil layers 21 to 24, the conductor layer 25 constituting the via conductor 26 is made of a conductive material containing a metal such as Ag. Each of the via conductor 26 is formed by a printing method. Specifically, each of the via conductors 26 is obtained by applying a conductive paste (for example, Ag paste) to be the conductor layer 25 onto the conductive paste to be the coil layers 21 to 24 and sintering the conductive paste.

The plurality of via conductors 26 all have the same shape and the same dimensions. As shown in FIGS. 4A to 4D, the via conductor 26 has a rounded square shape in which four corners are rounded when viewed from the stacking direction of the element body 12. The length of each side of the via conductor 26 is designed to be larger than the width of each of the coil layers 21 to 24, and the formation region of the via conductor 26 is larger than the formation region of the end portion of the coil layers 21 to 24. In addition, when the via conductors 26 are overlapped on the end portions 21*b*, 22*b*, 23*b*, and 24*b* of the coil layers 21 to 24, the via conductors 22 are overlapped to protrude in the extending direction of the end portions 21*b*, 21*b*, 23*b*, and 24*b* of the coil layers 21 to 24.

The conductor layers 25 constituting the via conductors 26 have the same shape and the same dimensions. As shown in FIG. 3, in a cross section parallel to the coil axis Z, the conductor layer 25 has a rectangular cross section extending parallel to the end surfaces 12*a* and 12*b* of the element body 12 and having two rounded corners on the end surface 12*a* side (so-called semicylindrical cross section). The thickness of each of the conductor layers 25 is, for example, 30 μm. In the via conductors 26, the conductor layers 25 form a concave-convex portion 27 (see FIGS. 10A and 10B) that is concave-convex in a direction orthogonal to the stacking direction of the element body 12 (that is, the direction of the side surfaces 12*c* to 12*f* of the element body 12).

FIGS. 5A, 5B, 6A, 6B, 7A, 7B, 8A, 8B, 9A, 9B, 10A, 10B, 11A, 11B, 12A, and 12B show a procedure for forming a part of the coil 20 by a printing method.

Figure 5B:
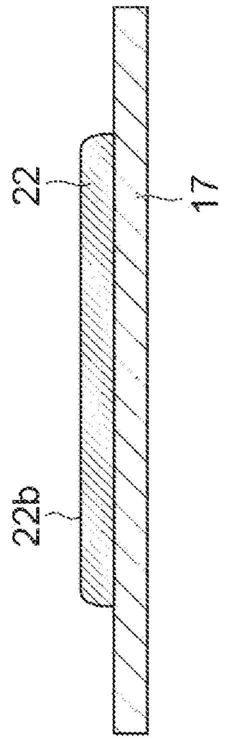
FIGS. 5A and 5B are views showing each step in manufacturing the element body.
Figure 5A:
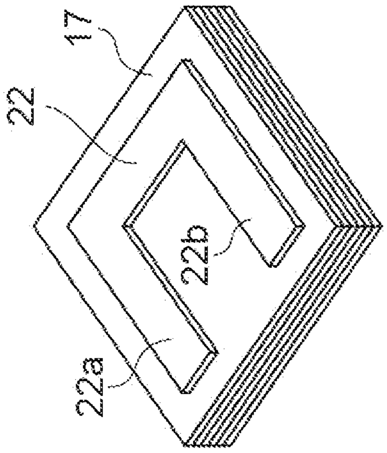

As shown in FIGS. 5A and 5B, first, a conductive paste for forming the coil layer 22 is printed on the magnetic layer 17 to be a base.

Figure 6B:
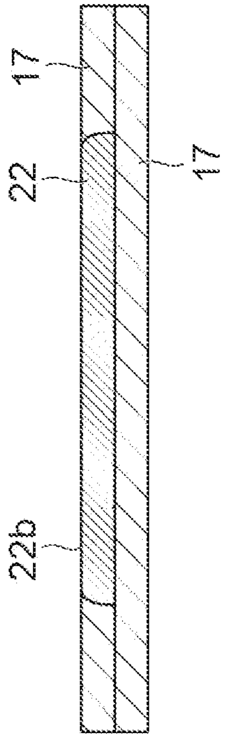
FIGS. 6A and 6B are views showing each step in manufacturing the element body.
Figure 6A:
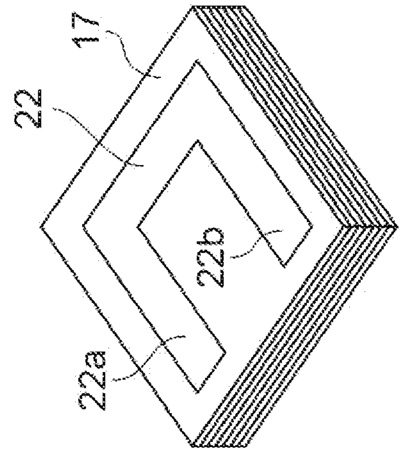

Next, as shown in FIGS. 6A and 6B, a magnetic paste for forming the magnetic layer 17 is printed to completely surround the coil layer 22. As a result, the stack becomes substantially flat.

Figure 7B:
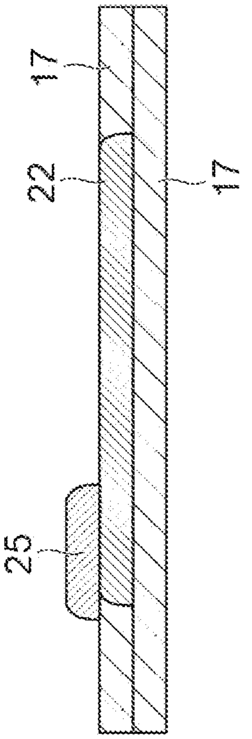
FIGS. 7A and 7B are views showing each step in manufacturing the element body.
Figure 7A:
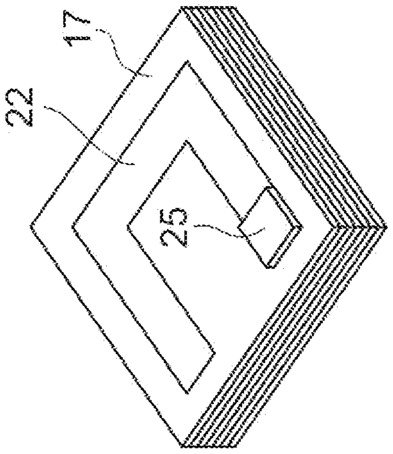

Then, as shown in FIGS. 7A and 7B, a conductive paste to be the first layer of the conductor layers 25 is printed on the end portion 22*b* of the coil layer 22 exposed on the stack. At this time, since the conductor layer 25 is larger than the end portion 22*b* of the coil layer 22, the conductor layer 25 protrudes outward from the end portion 22*b* of the coil layer 22 as shown in FIG. 7B.

Figure 8A:
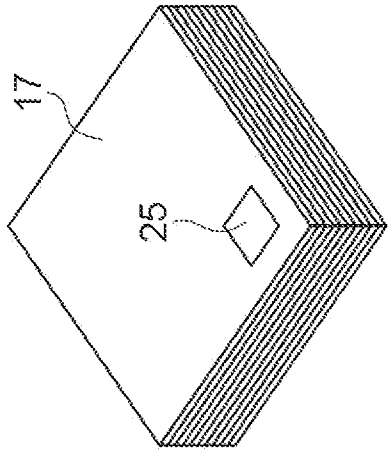
FIGS. 8A and 8B are views showing each step in manufacturing the element body.
Figure 8B:
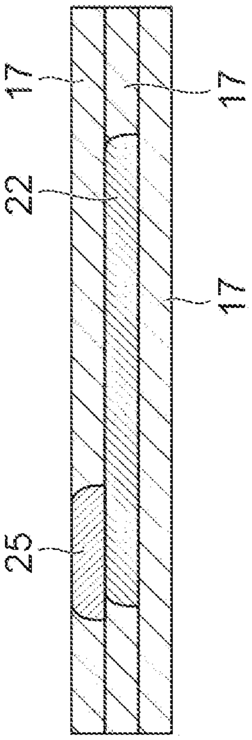

Subsequently, as shown in FIGS. 8A and 8B, a magnetic paste for forming the magnetic layer 17 is printed to completely surround the first layer of the conductor layers 25. Thereby, the stack is again substantially flat.

Figure 9B:
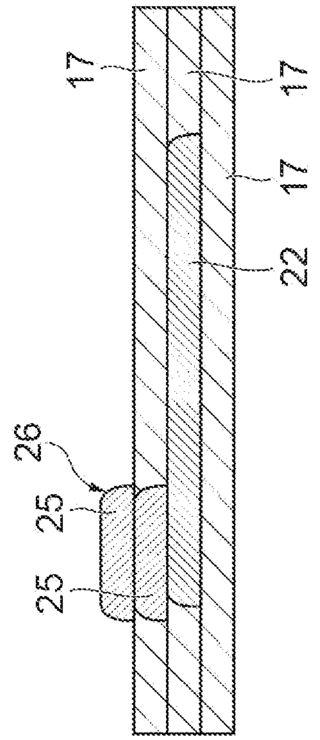
FIGS. 9A and 9B are views showing each step in manufacturing the element body.
Figure 9A:
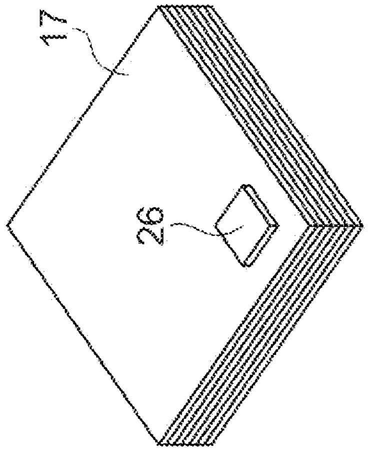

Next, as shown in FIGS. 9A and 9B, a conductive paste for forming the second layer of the conductor layers 25 is printed to overlap the first layer of the conductor layers 25. Thus, the via conductors 26 having two-layer structure is formed.

Figure 10B:
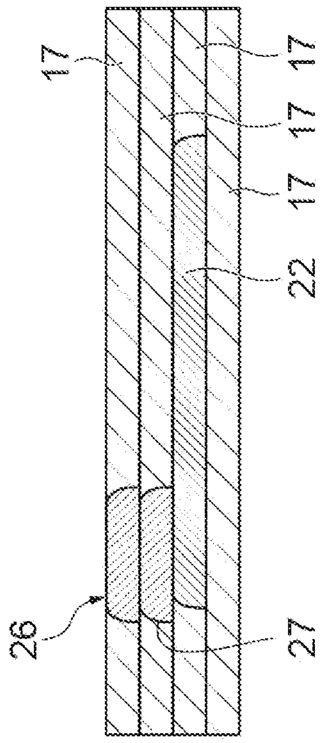
FIGS. 10A and 10B are views showing each step in manufacturing the element body.
Figure 10A:
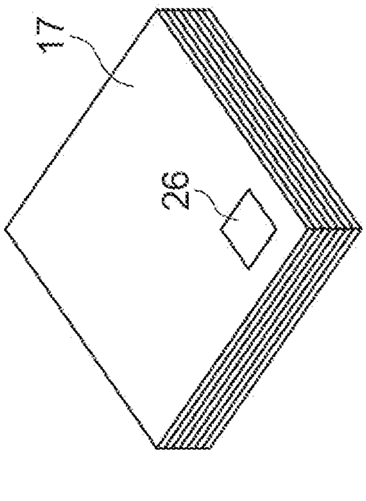

Then, as shown in FIGS. 10A and 10B, a magnetic paste for forming the magnetic layer 17 is printed to completely surround the second conductor layer 25. Thereby, the stack is again substantially flat.

Figure 11B:
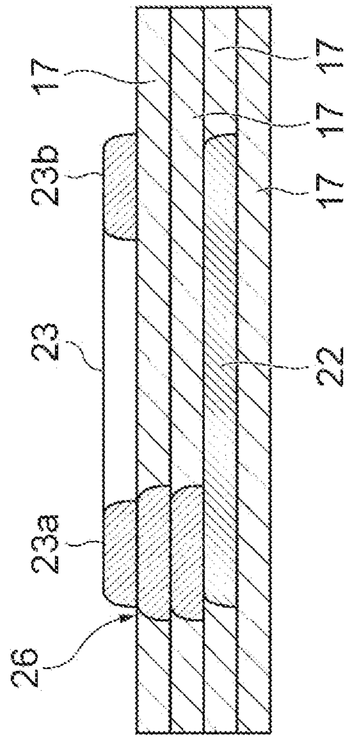
FIGS. 11A and 11B are views showing each step in manufacturing the element body.
Figure 11A:
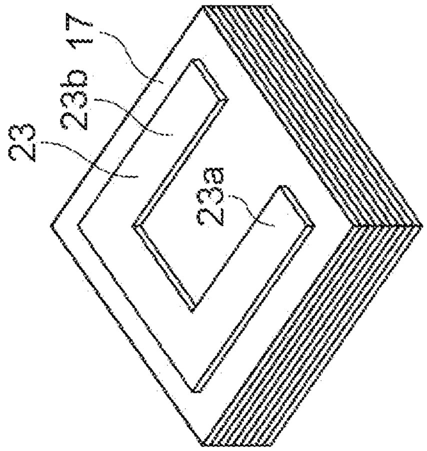

Subsequently, as shown in FIGS. 11A and 11B, a conductive paste to be the coil layer 23 is printed. At this time, the end portion 23*a* of the coil layer 23 overlaps the via conductor 26, and the coil layer 22 and the coil layer 23 are electrically connected via the via conductor 26.

Figure 12B:
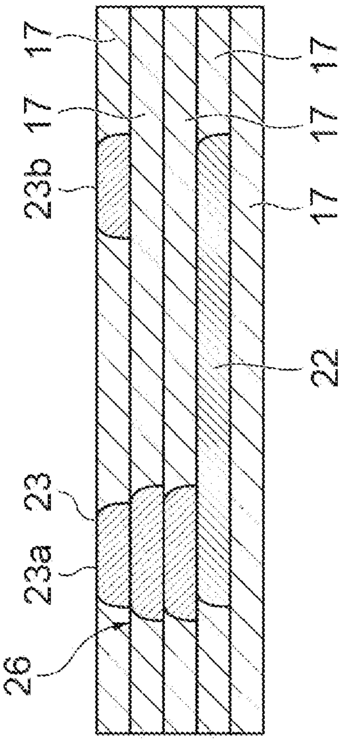
FIGS. 12A and 12B are views showing each step in manufacturing the element body.
Figure 12A:
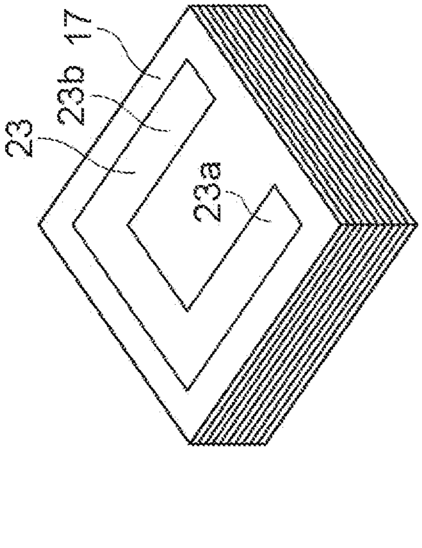

Next, as shown in FIGS. 12A and 12B, a magnetic paste for forming the magnetic layer 17 is printed to completely surround the coil layer 23. Thereby, the stack is again substantially flat.

In FIGS. 5A, 5B, 6A, 6B, 7A, 7B, 8A, 8B, 9A, 9B, 10A, 10B, 11A, 11B, 12A, and 12B, the procedure of providing the coil layer 21 on the coil layer 22 via the via conductor 26 is shown, but the coil layers 21 to 24 can be provided by the same procedure as described above.

Figure 13:
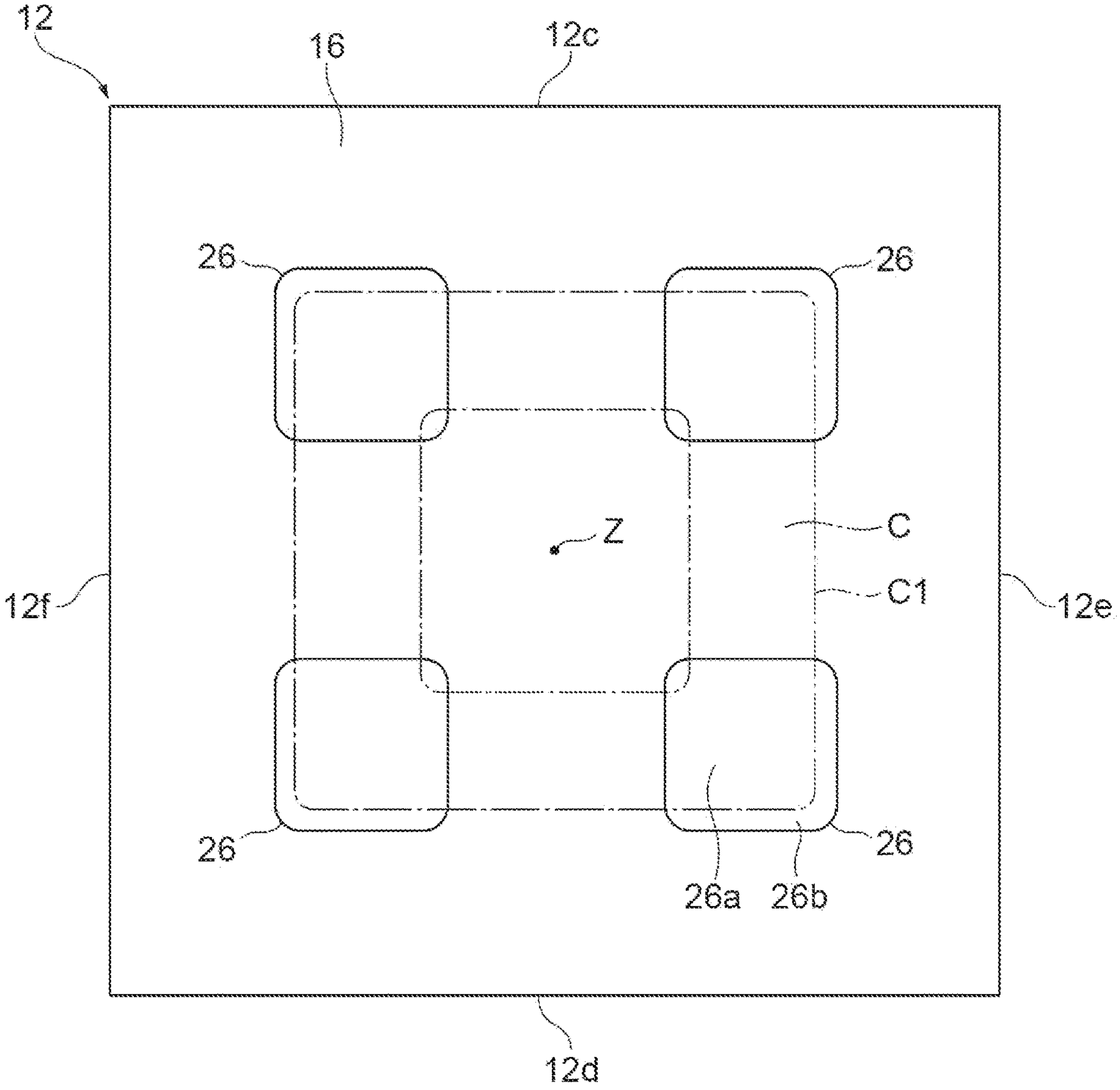
FIG. 13 is a diagram showing a positional relationship between the coil formation region and the via conductor.

The multi-layer coil layers 21 to 24 stacked sequentially form a rectangular ring coil region C as shown in FIG. 13 when viewed from the stacking direction of the element body 12. The plurality of via conductors 26 provided to overlap the coil layers 21 to 24 are located at any of the four corners of the coil region C. As described above, each of the via conductors 26 is provided to protrude from the end portions 21*b*, 22*b*, 23*b*, and 24*b* of the coil layers 21 to 24, and thus protrudes from the inside to the outside of the line Cl defining the outer shape of the coil region C (i.e., the contour line). As a result, each of the via conductors 26 protrudes from the coil region C toward each of the side surfaces 12*c* to 12*f* of the element body 12 when viewed from the stacking direction of the element body 12. In this case, each of the via conductors 26 includes an overlapping part 26*a* which is present in the coil region C (i.e., overlapped on the coil layers 21 to 24) and a non-overlapping part 26*b* which is present between the coil region C and the side surfaces 12*c* to 12*f* of the element body 12 (i.e., not overlapped on the coil layers 21 to 24), and the overlapping part 26*a* and the non-overlapping part 26*b* are integrated.

Figure 14:
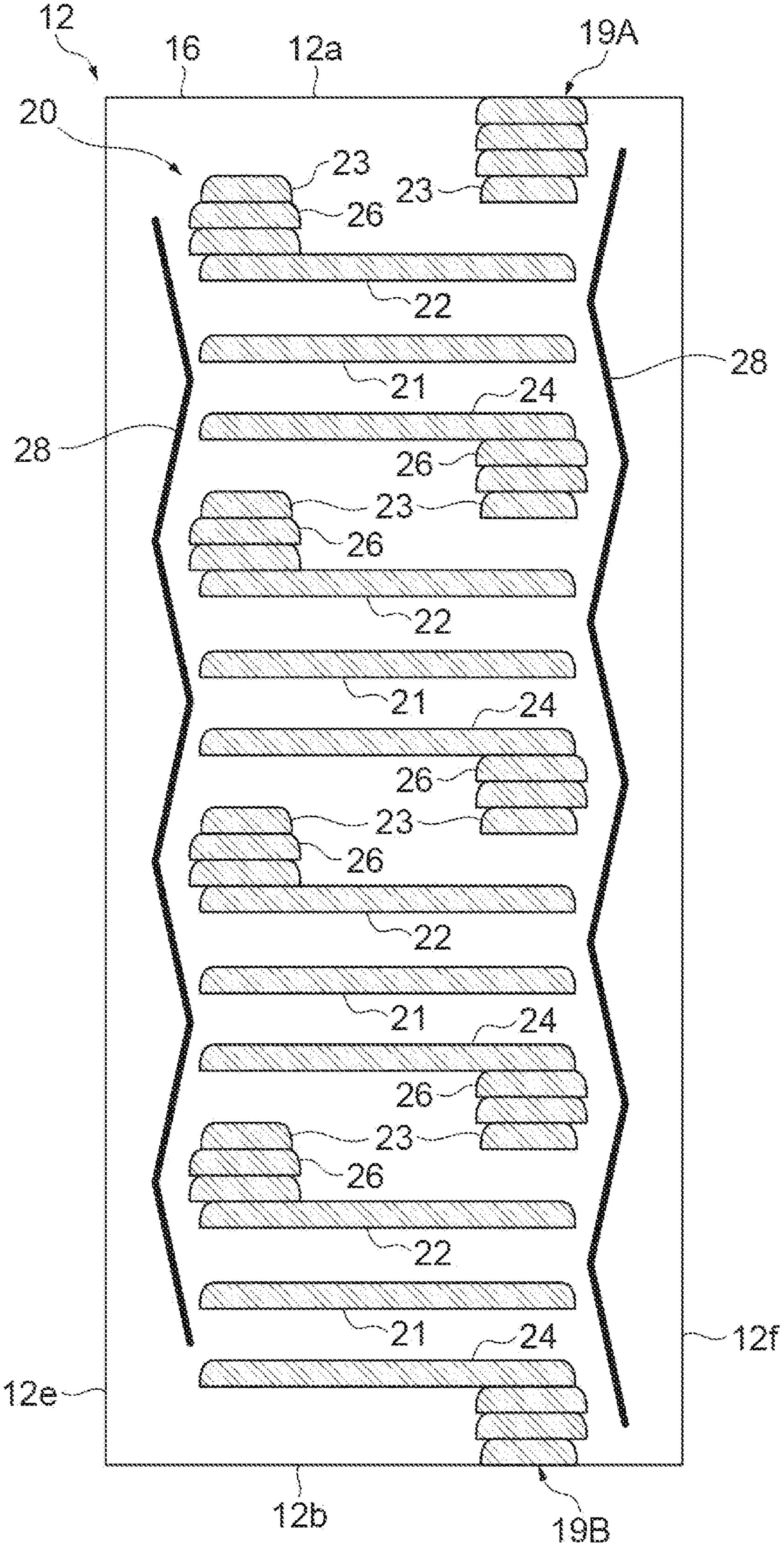
FIG. 14 is a diagram schematically showing a cross-sectional shape of the coil.

Therefore, as shown in FIG. 14, in a cross section parallel to the coil axis Z, the via conductors 26 protrude further toward the side surfaces 12*c* to 12*f* of the element body 12 than the coil layers 21 to 24. Therefore, as a whole of the coil 20, the concave-convex portion 28 that is concave-convex in the direction orthogonal to the stacking direction of the element body 12 (that is, a direction toward the side surfaces 12*c* to 12*f* of the element body 12) is formed. The concave-convex portion 28 of the coil 20 is concave-convex with respect to all of the four side surfaces 12*c* to 12*f* of the element body 12. The concave-convex portion 28 of the coil 20 reaches the lead conductors 19A and 19B. As shown in FIG. 14, in the side surfaces 12*e* and 12*f* facing each other, the positions of the concave and the convex of the concave-convex portion 28 facing the side surface 12*e* and those of the concave-convex portion 28 facing the side surface 12*f* are shifted from each other. More specifically, the plurality of via conductors 26 alternately protrude to the side surface 12*e* side and the side surface 12*f* side in the facing direction of the side surfaces 12*e* and 12*f* along the stacking direction of the element body 12, and protrude from the contour line Cl of the coil region C.

As described above, the multi-layer coil component 10 includes the plurality of magnetic layers 17 stacked, the element body 12 having the pair of end surfaces 12*a* and 12*b* facing each other in the first direction parallel to the stacking direction of the plurality of magnetic layers 17, the coil 20 provided in the element body 12 and having the coil axis Z parallel to the first direction, and the pair of external electrodes 14A and 14B provided on the end surfaces 12*a* and 12*b* of the element body 12. The coil 20 includes the plurality of coil layers 21 to 24 provided between the plurality of magnetic layers 17 constituting the element body 12 and arranged along the first direction, and the plurality of via conductors 26 provided between the coil layers 21 to 24 adjacent to each other in the first direction and electrically connecting the adjacent coil layers 21 to 24 to each other. When viewed from the first direction, the via conductor 26 protrudes from the contour line Cl of the coil region C in which the coil layers 21 to 24 are formed.

Therefore, as shown in FIG. 14, the coil 20 is provided with the concave-convex portion 28 from which the via conductors 26 protrude. When a force is applied to the multi-layer coil component 10 from the outside, for example, from the side of the surfaces 12*c* to 12*f*, the force is dispersed in the concave-convex portion 28 of the coil 20, and propagation of stress is less likely to occur. Therefore, defects are less likely to occur in the coil 12 compared to a coil in which the side of the side surfaces 12*c* to 12*f* is flat. That is, in the multi-layer coil component 10, the mechanical strength of the coil 20 is improved.

In addition, in the multi-layer coil component 10, the via conductor 26 formed of the plurality of conductor layers 25 has the concave-convex portion 27. Similarly to the concave-convex portion 28 of the coil 20, the concave-convex portion 27 of the via conductor 26 also has a function of dispersing a force from the outside from the side of the side surfaces 12*c* to 12*f*. That is, the mechanical strength of the coil 20 is further improved by the via conductor 26 having the concave-convex portion 27. In addition, the protruding portions of the concavo-convex portions 27 of the via conductors 26 serve as wedges that engage with the magnetic layer 17, thereby prevent from shrinkage of the via conductors 26 (relative shrinkage with respect to the magnetic layer 17) during sintering of the element body 12. Thus, disconnection of the via conductor 26 can be prevented.

Further, in the multilayer coil component 10, the plurality of via conductors 26 protrude from the contour line Cl of the coil region C not only in the cross section parallel to the side surfaces 12*c* and 12*d* as shown in FIG. 14 but also in the cross section parallel to the side surfaces 12*e* and 12*f*. Therefore, even when an external force is applied from any side of the side surfaces 12*c* to 12*f* of the element body 12, the force can be dispersed in the concave-convex portion 28 of the coil 20.

Although the embodiments of the present disclosure have been described above, the present disclosure is not necessarily limited to the above-described embodiments, and various modifications can be made without departing from the gist thereof.

For example, the coil region C may have a polygonal ring shape, a circular ring shape, or an elliptical ring shape. The planar shape of the via conductor 26 may be polygonal, circular, or elliptical. The number of conductor layers 25 constituting the via conductors 26 may be one or three or more layers. The cross-sectional shape of the conductor layer 25 constituting the via conductor 26 may be a semicircular or a semielliptical in which the side of the end surface 12*b* is flat.

What is claimed is:

1. A multi-layer coil component comprising:

an element body including a plurality of layers stacked and having a pair of end surfaces facing each other in a first direction parallel to a stacking direction of the plurality of layers and a side surface connecting the pair of end surfaces;

a coil provided in the element body and having a coil axis parallel to the first direction; and, a pair of external electrodes respectively provided on the end surfaces of the element body, wherein the coil having:

a plurality of coil layers provided between the plurality of layers constituting the element body and arranged along the first direction; and, a plurality of via conductors provided between the coil layers adjacent to each other in the first direction and electrically connecting the adjacent coil layers to each other, wherein, when viewed from the first direction, the via conductor protrudes from a coil region where the coil layer is formed toward the side surface of the element body.

2. The multi-layer coil component according to claim 1, wherein the via conductor is formed of a plurality of conductor layers, and has a concave-convex portion that is concave-convex in a direction orthogonal to the first direction.

3. The multi-layer coil component according to claim 2, wherein the conductor layer has a cross-sectional shape in a cross section parallel to the first direction, in which two corners on one end surface side of the rectangular element body extending in a direction orthogonal to the first direction are rounded.

4. The multi-layer coil component according to claim 1, wherein, in a cross section parallel to the first direction, the plurality of via conductors alternately protrudes from the coil region toward the side surface of the element body along the first direction on one side and the other side in a direction orthogonal to the first direction.

5. The multi-layer coil component according to claim 1, wherein, in a plurality of cross sections parallel to the first direction, the plurality of via conductors protrudes from the coil region toward the side surface of the element body.

6. The multi-layer coil component according to claim 1, wherein the element body is a sintered element body.

* * * * *